July 28, 1964

B. STEFANOV 3,142,121

MICROMETER

Filed Sept. 17, 1959

INVENTOR.
BORIS STEFANOV
BY
Elliott & Pastoriga
ATTORNEYS

United States Patent Office 3,142,121
Patented July 28, 1964

3,142,121
MICROMETER
Boris Stefanov, Glendale, Calif., assignor to Elmic,
Incorporated, a corporation of California
Filed Sept. 17, 1959, Ser. No. 840,565
3 Claims. (Cl. 33—143)

This invention relates generally to micrometers and more particularly to an improved micrometer particularly useful in industrial quality control applications.

Conventional micrometers usually operate on the principle of a lead screw of accurate pitch such that threading of the screw will bring one micrometer surface closer to or further from the other micrometer surface. A reading of either the absolute dimension or the relative distance moved is indicated by the position of an index point or similar marker on the rotatable portion of the micrometer with respect to a graduated scale on a fixed portion. Since the screw pitch is relatively fine to afford the required degree of accuracy, it generally takes a relatively long period of time to make any major distance change between the micrometer surfaces. Moreover, a relatively long lead screw is required to provide a large operating range and in such cases expansion and contraction of the screw as a result of temperature changes can impair the accuracy of the device.

As a consequence of the foregoing, it has been the practice to provide micrometers in various different sizes so that the initial distance between the micrometer bearing surfaces constitutes a standard distance and then further movements of the surfaces away from each other can be effected in small increments. Thus by initially selecting a properly sized micrometer, the problem of large range adjustments can be avoided. This solution however is inefficient to the extent that several different sized micrometers must be kept on hand.

In addition to the above, a given length of time is required to insure an accurate reading on the micrometer scale. This time consuming operation primarily results from the relatively small indicia on the scale itself coupled with parallax effects and limitation of human eye sight. Magnifying glasses and the like can alleviate the problem somewhat, but nevertheless close scrutiny and re-checking is often necessary.

With the foregoing in mind, two primary objects of the present invention are to provide a novel micrometer device which, first, avoids the use of any type of lead screw for computing distances to the end that one micrometer surface may be rapidly moved with respect to the other micrometer surface over a relatively large range of from, for example, one mil to several inches or even feet; and, second, in which the output reading is displayed in large easy to read numerals which may, for example, be one or two inches in height.

Another important object is to provide a micrometer meeting the foregoing objects which is accurate to at least one mil and yet which may be manufactured relatively economically.

Another object is to provide a micrometer meeting the foregoing objects which is relatively insensitive to temperature changes.

Briefly these and many other objects and advantages of this invention are attained by providing a micrometer which incorporates a signal generating system responsive to relative movement between the micrometer bearing surfaces to provide a number of signals proportional to the distance moved. These signals in turn are totalized by a suitable counter means so that a visual display of the reading or setting of the micrometer is instantly available.

In the preferred embodiment of the invention, an optical track having alternate transparent and opaque portions of the order of one mil in width is arranged to move with one micrometer surface. This track is received between a light source and photo-cell means stationarily mounted with respect to the other micrometer surface so that the relative movement of the surfaces results in movement of the track between the light source and photo-cell. The resulting modulation of the light impinging on the photo-cell results in the generation of an electrical wave form from which suitable signals or pulses are derived for operating an electronic counter. Since the ruling of high grade optical glass can be accomplished with extreme accuracy to provide the alternate transparent and opaque portions, the accuracy of the micrometer itself is assured.

In addition to the foregoing, the preferred embodiment of the invention includes sensing means for indicating the direction of movement of one surface relative to the other and novel zero-set means for establishing an initial "zero" reading from the micrometer for any particular separation distance of the micrometer surfaces. From this "zero" position the counter will then display as a positive count the total distance moved from either side of the "zero" position. As a consequence, the micrometer is extremely simple to use, very rapid in operation, and extremely easy to read.

A better understanding of the invention will be had by referring to the preferred embodiment thereof as illustrated in the accompanying drawings, in which.

Figure 1:
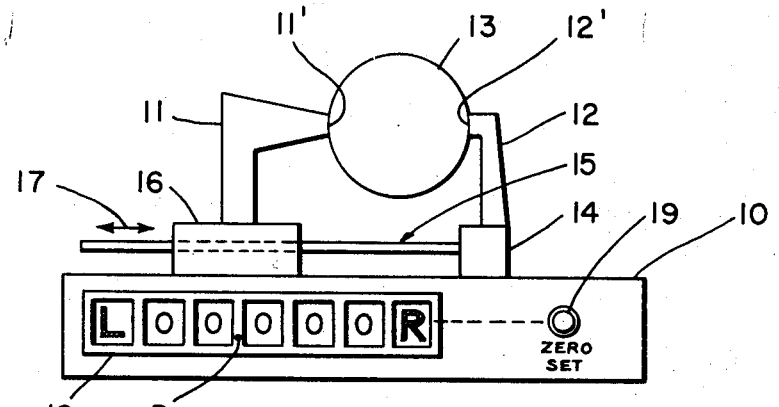
FIGURE 1 is a diagrammatic illustration of the micrometer of the invention illustrating a work piece or a standard dimensioned block positioned between the micrometer surfaces.

Referring first to FIGURE 1, there is shown a base mounting structure 10 including a first micrometer arm 11 terminating in a suitable micrometer surface 11' and a second micrometer arm 12 terminating in a second micrometer surface 12'. As shown, a work piece 13 is positioned between the micrometer surfaces 11' and 12'.

In the embodiment chosen for descriptive purposes, the micrometer arm 12 is movable with respect to the arm 11 and to this end is mounted on a movable carriage 14 slidable to the left and right along the top surface of the base 10. Carriage 14 also supports an elongated measuring optical track 15 which moves with the carriage and passes through the stationary base structure 16 for the arm 11. Back and forth movement of the arm 12 and carriage 14 will thus cause the optical track 15 to move back and forth relative to the base 16 of the arm 11 all as indicated by the double headed arrow 17.

The base 16 includes certain components responsive to relative movement of the track 15 for generating electrical signals to operate an electronic counter 18 having a visual display as shown. This counter includes an extreme left hand window with the letter L shown therein and an extreme right hand window with the letter R shown. Between the left and right hand windows there are provided five digit windows for displaying numerals indicative of distances accurate to the third decimal place. The decimal point itself is shown at P. Counter means to provide visual numeral displays of five significant figures are well known in the art. The particular number shown in the counter of FIGURE 1 is determined by the distance the arm 12 is moved either to the left or right from an initial starting point at which the counter reads 0. If inches are used as the standard of measurement, the counter will provide a visual display in increments of 1/1000 of an inch or 1 mil.

The micrometer illustrated in FIGURE 1 also includes a "zero"-set button 19 on its front face adjacent to the counter 18. This "zero"-set button is arranged upon actuation to set the counter to a zero reading as shown, for any initial starting position to which the movable micrometer arm 12 is set. Any subsequent movement of the arm 12 will then be relative to its position at the time the "zero"-set button 19 is depressed. The micrometer therefore essentially measures differences in distances rather than absolute distnaces. For example, by inserting a standard workpiece of a known dimension between the micrometer surfaces, such as a one inch standard block, subsequent measurements shown by the counter will indicate the amount by which the dimension of the new work deviates from one inch.

On the other hand, if the micrometer surfaces are brought into direct engagement with each other, the "zero"-set button 19 may then be depressed when in this position. Movement of the arm 12 away from the arm 11 to the right will then provide absolute dimension readings on the counter 18.

Figure 2:
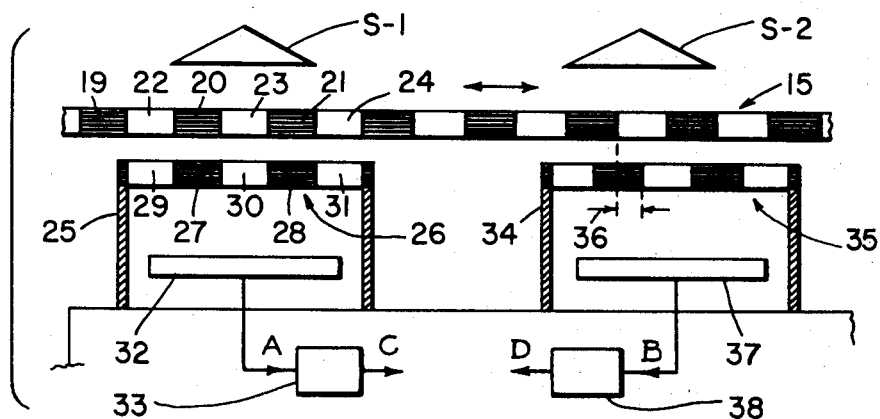
FIGURE 2 is a schematic diagram illustrating certain essential components incorporated in the micrometer of FIGURE 1.

In FIGURE 2, various components within the stationary base structure 16 supporting the arm 11 and with respect to which the optical track 15 moves are schematically illustrated in an elevational cross section or edge-on view.

As shown, the measuring optical track 15 includes alternate opaque and transparent portions such as indicated at 19, 20, and 21; and 22, 23, and 24, respectively. Immediately below the track 15 is a first stationary housing 25 supporting a first optical reference track 26. This track also includes alternate opaque and transparent portions as indicated at 27, 28; and at 29, 30, and 31, respectively. Beneath the first optical track 26 is a first photoelectric cell 32 having its output connected to a square wave generator 33. A first light source S-1 is positioned so that the measuring optical track 15 passes between the light source and the first photoelectric cell 32.

Also included is a second stationary housing 34 supporting a second optical track 35 having alternate opaque and transparent portions similar in every respect to the optical track 26. The second optical track 35, however, is off set with respect to the measuring optical track 15 by one-half of the width dimension of one of the transparent portions, as indicated by the arrows 36, when the transparent portions of the optical track 26 are in registration with the transparent portions of the measuring track 15.

A second light source S-2 is positioned above the second optical track 35 and measuring track 15 and a second photoelectric cell 37 provided below the tracks. The output of the photoelectric cell 37 passes to a second square wave generator 38.

From the foregoing arrangement, it will be evident that as the micrometer arm 12 in FIGURE 1 is moved towards or away from the micrometer arm 11 to in turn move the track 15, there will be developed a modulated signal from each of the photo-cells which will rise and fall with the varying light intensity resulting from light passing through the track 15 and the first and second tracks 26 and 35 from the respective light sources S-1 and S-2. Thus, referring to FIGURE 3 there are indicated wave forms A and B indicative of this varying light intensity from the cells 32 and 37 respectively. For example, with reference to the wave form A, if it is assumed the track 15 is moving to the left in FIGURE 2, the maximum light intensity falling on the cell 32 will gradually decrease until the opaque portions 20 and 21 of the track 15 are positioned to eclipse the transparent portions 29 and 30 of the track 26. At this point, minimum light intensity will result as indicated by the wave form A at its lowest most point. Continued movement of the track 15 to the left will then result in a gradual increase in light intensity up to a maximum value. The wave form thus first decreases and then increases and then decreases as shown.

A similar wave form B will result from the photo-cell 37. Because of the off set however, this wave form will be out of time phase with the wave form A. Thus, as the track 15 moves to the left the tranparent portions of the track 35 will be totally eclipsed sooner than will the transparent portions of the track 26 so that the wave form B will reach its minimum value prior to the wave form A. Similarly, the wave form B will reach its maximum value prior to the wave form A.

The square wave generating circuits 33 and 38 may take the form of trigger or "Schmidt" bi-stable circuits which have the property of assuming either one condition or another. In the one stable position, a given constant voltage output is provided and in the other, a zero or low constant voltage output is provided . The condition the circuit assumes is determined by the wave form fed into the circuit. Thus, at the output of the square wave generator 33 there will be provided a wave form as indicated by the graph C in FIGURE 3 wherein it will be noted that as the input wave form A passes from its high level towards its low level the output wave form C will switch from its maximum voltage condition to its minimum voltage condition. Until the wave form A again passes through its medium voltage level in moving from its lower towards its higher position, the circuit C will remain in its low voltage condition. At the crossover point it will then immediately switch to its high voltage condition. There thus results the squarewave as shown.

Similarly, the output of the squarewave generator 38 provides a similar squarewave as indicated at D which is displaced in time phase as shown.

By providing the two wave forms C and D, it is possible to sense the direction in which the track 15 is moving. For example, with reference to the vertical dashed lines designated 1, 2, 3, and 4 in the graphs C and D in FIGURE 3, it will be apparent that if the track is moving to the left, at the time of the vertical dashed line 1, the voltage of the wave form C changes from up to down only when the voltage of the wave form D is down. At the time of the dashed line 2, the wave form D is changing from down to up only when the wave form C is down. At the time of the dashed line 3 the wave form C is changing from down to up only when the wave form D is up. Finally, at the time of the dashed line 4, the wave form D is changing from up to down only when the wave form C is up. Thus at any point in time in considering the two wave forms C and D together, the foregoing conditions can only exist when the track 15 is moving to the left.

Figure 3:
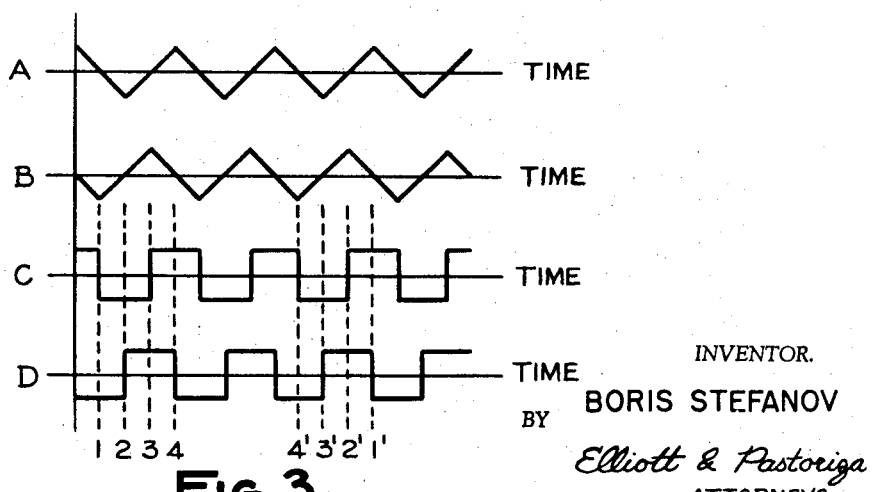
FIGURE 3 is a series of wave forms useful in explaining the operation of the components illustrated in FIGURE 2.

On the other hand, if the track 15 is moving to the right only the following conditions can prevail taken with reference to the dashed line 1', 2', 3', and 4' of FIGURE 3. At the time of the dashed line 1', the wave form D is moving from down to up only when the wave form C is up. At the time of the dashed line 2', the wave form C is moving from up to down only when the wave form D is up. At the time of the dashed line 3', the wave form D is moving from up to down only when the wave form C is down. Finally, at the time of the dashed line 4', the wave form C is moving from down to up only when the wave form D is down.

Again it will be evident that these latter conditions at any time taking the wave forms C and D together can only exist if the track 15 is moving to the right.

Figure 4:
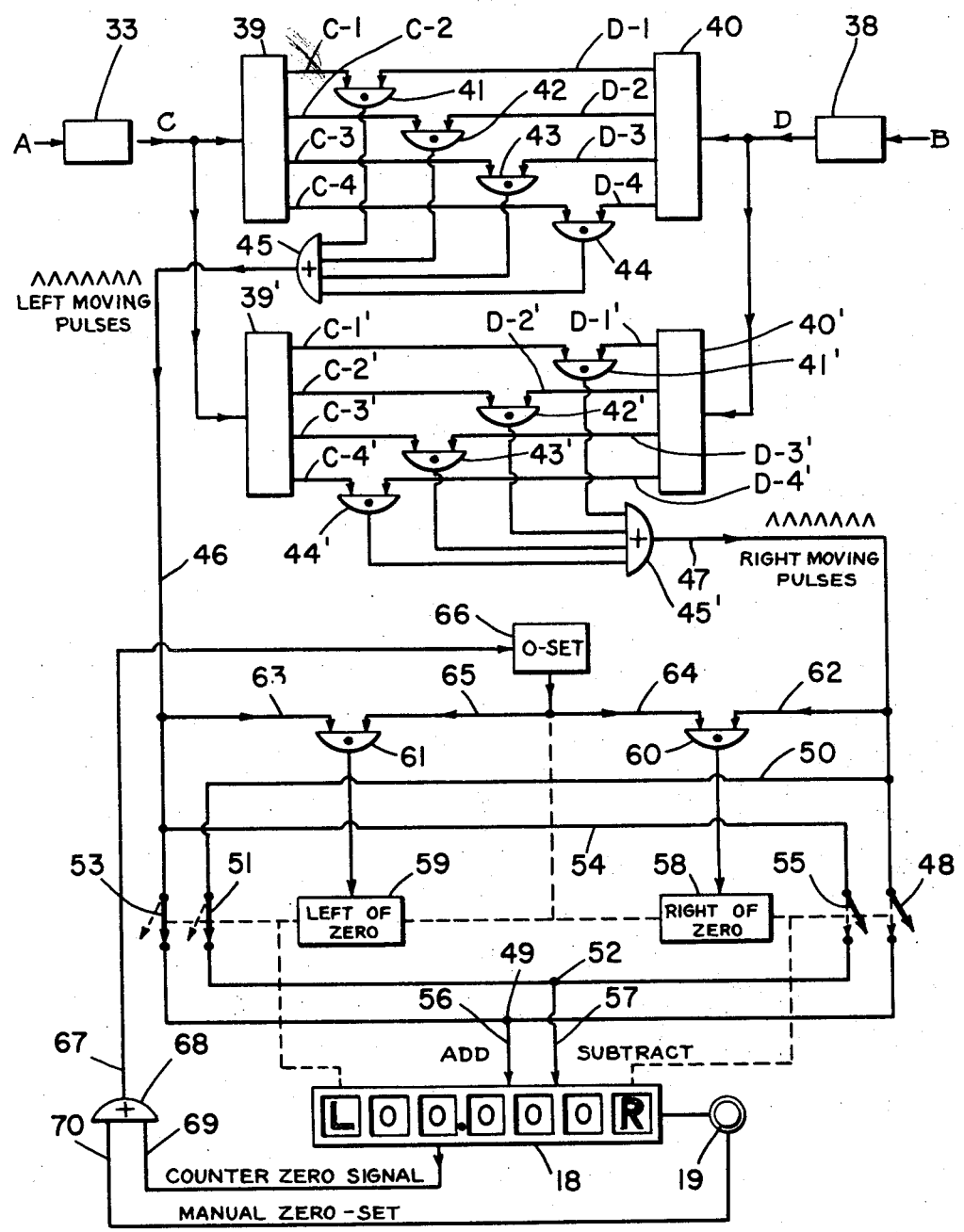
FIGURE 4 is a schematic block type diagram of the electrical circuit co-operating with the components illustrated in FIGURE 2.

Referring now to FIGURE 4, it will be noted that the wave forms C and D from the square wave generators 33 and 38 are fed into suitable pulse generating circuits 39 and 40 respectively. Output pulses are generated in the output lines C-1, C-2, C-3, and C-4 from the circuit 39 and output pulses are generated in the lines D-1, D-2, D-3, and D-4 from the circuit 40. The line C-1 only carries a pulse under the condition of wave form C of FIGURE 3 changing from up to down and the line D-1 only carries a pulse under the condition of the wave form D being down. Similarly, the line C-2 carries a pulse only under the condition of the wave form C being down and the line D-2 carries a pulse only under the condition of the wave form D moving from down to up. The lines C-3 and D-3 and C-4 and D-4 similarly carry pulses only under the conditions described in connection with the vertical dashed lines 3 and 4 in FIGURE 3.

The respective leads as shown are fed into electrical circuits 41, 42, 43, and 44. These circuits are referred to in the art as "and" circuits and have the property of providing an output pulse only when input pulses are received simultaneously on the two input leads. As shown, the various outputs connect through an output circuit 45 known in the art as an "or" circuit, which has the property of passing a pulse at its output when any one of its input lines delivers a pulse. Since the only condition under which pulses will be provided from any one of the "and" circuits 41, 42, 43, or 44 is the concurrence of the pulses in the corresponding pairs of input lines C-1, D-1; C-2, D-2; C-3, D-3; and C-4, D-4; respectively, and since such concurrence can only take place when the measuring optical track 15 is moving to the left as described in connection with FIGURES 2 and 3, the only pulses appearing from the output of the "or" circuit 45 will be those resulting from movement of the optical track to the left. These pulses are thus referred to as left moving pulses and are passed through an output line 46 as shown.

As also shown in FIGURE 4, the output wave forms C and D are simultaneously fed to electrical circuits 39' and 40' respectively providing pulses along output lines C-1', C-2', C-3' and C-4'; and output lines D-1', D-2', D-3', and D-4'. The condition of a pulse on any one of these lines is determined by the conditions of the wave forms as described with respect to the vertical dashed lines 1', 2', 3', and 4' of FIGURE 3 and simultaneous pulses can only occur on the pairs of input lines to the various "and" circuits 41', 42', 43', and 44' when the optical track is moving to the right. Thus, as in the case of the sensing circuit for movement to the left, there is provided an output "or" circuit 45' which will produce a pulse when any one of the input leads thereto has a pulse on its line which condition can only exist when the optical track is moving to the right. Therefore, only pulses will occur on the output line 47 when the optical track 15 is moved to the right. These pulses are referred to as right moving pulses.

As shown, the right moving pulses on the output line 47 pass through a switch arm 48 when in closed position to a first junction point 49. A branch line 50 above the switch arm 48 extends from the line 47 through a switch arm 51 to terminate in a second junction point 52. Similarly, the left moving pulses on line 46 pass through a switch arm 53 to the first junction point 49 and also through a branch line 54 and a switch arm 55 when in closed position, to the second junction point 52. The junction point 49 is connected to an add input 56 to the counter 18 while the junction point 52 is connected to a subtract input 57 to the counter 18. By this arrangement, pulses received at the add input 56 will be added together or totaled to a number which will appear in the display windows, whereas pulses received at the subtract input 57 will subtract from such number.

The switch arms 48 and 55 are controlled by a "right of zero" circuit 58 and the switch arms 51 and 53 are controlled by a "left of zero" circuit 59. The right and left of zero circuits 58 and 59 in turn are actuated by signals from the output of the two "and" circuits 60 and 61. One of the inputs to the "and" circuit 60 constitutes right moving pulses from the line 47 through a lead 62. Similarly one of the inputs for the "and" circuits 61 constitutes left moving pulses from the line 46 through a lead 63. The other two inputs are derived through lines 64 and 65 connecting to the output of a "zero-set" circuit 66. The "zero-set" circuit 66 in turn is controlled through a lead 67 constituting the output of an "or" circuit 68 having a first input line 69 connected to the counter 18 and a second input line 70 connected to the manual zero-set button 19. By this arrangement, the zero-set circuit 66 can be actuated either by a signal from the counter 18 provided only when the counter reads zero or by the depression of the zero-set button 19, which sets the counter at zero, either one of these signals passing through the "or" circuit 68 and lead 67 to the zero-set circuit 66. It will be understood accordingly that the zero-set circuit 66 is only active when the counter reads zero.

The zero-set circuit 66 when actuated, serves as an enabling circuit by providing a signal on the lines 64 and 65 to the respective inputs of the "and" circuits 60 and 61. If a right moving pulse is received in the "and" circuit 60 through the line 62 from the line 47 prior to reception of a left moving pulse at the input of the "and" circuit 61 through the line 63 from line 46, the "right of zero" circuit 58 will be energized to close the switch arms 48 and 55. On the other hand, if a left moving pulse is first received, the "left of zero" circuit 59 will be energized to close the switch arms 51 and 53. The arrangement is such that it is not possible for both the "right of zero" and "left of zero" circuits to be energized simultaneously. When one is energized the other is de-energized. As indicated by the dashed lines, the "right of zero" and "left of zero" circuits are connected to the L and R letter windows of the counter 18. When the "left of zero" circuit is energized the letter L is illuminated in the counter and when the "right of zero" circuit is energized, the letter R is illuminated. The zero set circuit is also directly coupled to both the "left of zero" and "right of zero" circuits as indicated to de-energize both circuits when the zero set circuit itself is energized. Thus in the absence of left or right moving pulses and with the counter set at a zero reading, the zero-set circuit will be energized but both "left of zero" and "right of zero" circuits will be de-energized and their corresponding switch arms 51, 53 and 55, 48 will be open.

With the above description in mind, the operation of the entire micrometer will now be described. Referring again to FIGURE 1, assume it is desired to measure the diameters of several hundreds of work pieces in a quality control process to make sure that they correspond to the diameter of a standard workpiece such as the workpiece 13. Assume also that a deviation of no more than 5 mils, for example, can be tolerated. For this operation, the standard workpiece 13 may first be inserted between the micrometer arms 11 and 12 and the micrometer surfaces 11' and 12' brought into engagement with the piece as shown. At this point, the zero-set button 19 is depressed. Referring to FIGURE 4, depression of this button 19 will set the counter digital windows all to a zero reading and also will provide a signal through the "or" circuit 68 to the zero-set circuit 66 which energizes the same to provide an enabling voltage on the lines 64 and 65 for the "and" circuits 60 and 61 respectively. With no motion of the optical track, no right moving or left moving pulses will be generated and thus, since the "and" circuit 60 and 61 will only provide an output signal when both inputs are energized simultaneously, the "right of zero" and "left of zero" circuits 58 and 59 will be de-energized and the switches 55 and 48 will be open and the switches 51 and 53 will be open. There will thus be no connection to the add and subtract inputs to the counter 18.

If now the standard workpiece 13 is removed and a similar workpiece supposedly manufactured to the same dimension inserted, any deviation in the diameter can be instantly measured. For example, assume that the new workpiece is less than the standard dimension by 3 mils. In this event, the movable arm 12 of the micrometer of 51 when moved into engagement with the new workpiece will cause the track 15 to move to the left a distance of three mils. This leftward movement will result in the generation of the various wave forms A, B, C, and D depicted in FIGURE 3. If the alternate opaque and transparent portions on the various tracks are each 1 mil in width, the generated wave forms C and D will each vary up and down three times giving a total of six changes. For example, in FIGURE 3, referring to the vertical dashed lines 1, 2, 3, and 4, at each of these instances either the wave form C or D is changing from an up or down or down to up condition which change will result in pulses being provided on the left moving pulse line 46 of FIGURE 4. Thus, movement of one mil, that is the distance covered by the width of one transparent or one opaque portion, will result in the generation of two pulses and therefore, if the total distance that the track is moved to the left is 3 mils there will result a total of six pulses.

Since the present work being tested is smaller in diameter, with the resulting movement of the track to the left, the first generated pulse is a left moving pulse which passes down the line 46 and branch lead 63 to the "and" circuit 61 thereby immediately energizing the "left of zero" circuit 59 to close the switch arms 51 and 53. With both the switch arms 51 and 53 closed, it will be evident that the left moving pulses will be passed directly to the junction point 49 into the "add" input 56 of the counter 18. The counter is arranged to count 1 mil in response to every two pulses received so that the reception of the six pulses at the add input 56 will result in a showing of the numeral 3 in the "thousandths" digit window. The change in the counter from a zero reading will then automatically de-energize the "zero set" circuit 66 and thereby remove the enabling voltage from lines 64 and 65. Therefore, the "right of zero" circuit 58 cannot be energized and switch arms 48 and 55 will remain open.

Since the left of zero circuit 59 is energized, this circuit through its dotted line connection to the L window will result in the letter L lighting up indicating to the operator that movement has taken place to the left and that the workpiece is three mils smaller in dimension than it should be. The workpiece may then be removed, and since it is within the 5 mil toleration limit, it will pass inspection.

Suppose now that the next workpiece inserted in only 2 mils less than the standard dimension. To insert this workpiece between the arms 11 and 12, the track must be moved to the right 1 mil. In so moving the track to the right 1 mil two right moving pulses will be generated in the line 47. These pulses will pass through the branch lines 62 to the "and" circuit 60 but will not operate the "right of zero" circuit 58 since the enabling voltage on line 64 from the zero-set circuit 66 is not present. The two right moving pulses however will pass through the branch line 50 and switch arm 51 to the junction 52 and thus into the subtract input 57 of the counter. This will result in a subtraction of 1 mil so that the former reading of 3 mils on the counter will now change to 2 mils indicating that the present workpiece is 2 mils less in dimension than the standard.

As a final example, assume that a workpiece is inserted which is 4 mils larger than the standard. If this workpiece is substituted between the arms 11 and 12, the arm 12 must now be moved from its 2 mils to the left of the standard or original zero-set position to a position 4 mils to the right. In moving from the 2 mils to the left up to the 0 point, four more right moving pulses will be generated which will result in a subtraction, through the circuit just previously described, of 2 mils showing on the counter whereby the counter will read 0. At this point, the counter zero signal line 69 will provide a signal to the zero-set circuit 66 actuating the same and thus placing the "and" circuits 60 and 61 in an enabled condition. Simultaneously, the "left of zero" circuit 59 will be de-energized. As the track 14 moves further to the right past 0, the next pulses received will be right moving pulses and when the first of these right moving pulses is received in the line 62, it will pass through the "and" circuit 60 to energize the "right of zero" circuit 58. The "right of zero" circuit 58 will close switch arms 55 and 48 to pass the right moving pulses to the junction point 49 to the add input 56. Since in the example chosen the present workpiece is 4 mils larger than the standard, eight right moving pulses will be received at the add input so that the counter will register 4 mils. As before, the instant the counter circuit reading moves from its zero reading, the enabling voltage on lines 64 and 65 is removed so that the "left of zero" circuit 59 cannot be energized until the counter passes through zero and left moving pulses are received. It should also be understood that when the "right of zero" circuit 58 is energized, through the dashed lines shown, it will illuminate the right hand window letter R to indicate to the operator that he is now to the right of the standard value or zero-setting of the counter.

From the foregoing description, it will be evident that the micrometer of this invention is highly useful in that it gives a direct reading in thousanths of an inch of differences between a standard and a given workpiece thereby greatly facilitating quality control operation. As mentioned heretofore, by zero-setting the counter when the micrometer bearing surfaces are in engagement with each other, absolute measurements can readily be indicated.

An important feature of the invention resides in the fact that when the operator is operating to the left of zero, the counter adds pulses and the letter window L is illuminated indicating that the absolute quantity shown in the windows is the amount by which the workpiece is less in a certain dimension than a standard piece. Also when working to the right of zero, the letter window R is illuminated and the letter window L extinguished, indicating to the operator that the absolute reading in the windows is the distance by which the workpiece being measured is greater than the standard.

Since two pulses are provided for each 1 mil of movement, it will be evident that the counter may be altered to be responsive to a single pulse rather than 2 pulses so that the counter can actually indicate to accuracies of ½ mil.

In the actual manufacture of the electronic micrometer as described, the only critical elements are the optical measuring track 15 and the first and second optical tracks 26 and 35 shown in FIGURE 2. None of the electrical circuit elements are at all critical and very inexpensive components can be used. The reason that non-critical electrical components can be used resides in the fact that the numerical value displayed by the counter depends only on pulse counts and not on the quality or shape of the pulses. Since the number of pulses is a function of the relative movement of the optical track, the track itself is the only piece of equipment which requires care in manufacture.

While it is desirable of course, it is not necessary that the photo-electric cells 32 and 37 have the same response or that the light sources S-1 and S-2 be of the same intensity. The output wave forms C and D will be constant notwithstanding variations in the quality of the input wave forms A and B because of the use of the trigger circuits 33 and 38. These trigger circuits are only responsive to a change in voltage level before triggering to one absolute condition or the other. Thus, their output wave forms are substantially the same regardless of small variations in the input wave forms.

Furthermore, there is no need for amplifiers between the output of the photo-cells and the trigger circuits since relatively high light intensity can be provided by making the cell chambers 25 and 34 large and the tracks 26 and 35 of sufficient length to pass the necessary light intensity when in registration with the measuring track 15. Thus, in actual practice, there will be several hundred transparent and opaque portions in registration to pass light to teach photo-cell. For example, if the tracks 26 and 35 are each one inch long, there will be 500 transparent portions each separated by one mil which is more than ample to provide sufficient output from the cells.

As a consequence of all of the foregoing, the device can be manufactured relatively inexpensively. Moreover, since the device is always zero-set in an initial measurement, it is extremely accurate in the distances indicated from the set distance. In other words, the zero-set distance from which distances are to be measured can be any particular value and it is the difference distances that are ordinarily the only distances important in the type of work for which the instrument is designed.

Since the carriage 14 can be readily moved along the base supporting block 10, a wide range of adjustments can be very quickly made, there being no lead screw or the like necessary. The counter itself may, as mentioned, be of any well known type in which large displays of the numerals on a cathode ray tube, for example, are readily provided so that the entire instrument is extremely simple to read.

Finally, the electronic micrometer of this invention lends itself well to automation processes. Since electrical pulses indicative of a dimension are available, these may be fed directly into automatic handling machinery, in place of the counter, to effect automatic rejection of stock whose dimensions fall outside given tolerances.

While only one embodiment of the micrometer has been shown and described, many modifications that fall clearly within the scope and spirit of this invention will occur to those skilled in the art. The micrometer is therefore not to be thought of as limited to the exact embodiment set forth merely for illustrative purposes.

What is claimed is:

1. An electronic micrometer comprising, in combination: a first member having a micrometer surface; a second member having a micrometer surface; means mounting said first and second members for relative movement with respect to each other to bring said surfaces into engagement with a work; means responsive to movement of said first member relative to said second member for generating a series of electrical pulses proportional in number to the change in distance resulting from the relative movement, said means including direction sensing means such that said electrical pulses constitute right moving pulses when said second member moves relatively to said first member in one direction and left moving pulses when said second member moves relatively to said first member in an opposite direction; counter means including an add pulse input and a subtract pulse input; a zero set circuit; a right of zero switching means; at left of zero switching means; a right of zero enabling means electrically connected to said right of zero switching means; and a left of zero enabling means electrically connected to said left of zero switching means, said zero set circuit being electrically connected to said counter means and responsive to a zero reading on said counter means to establish an enabling condition in said right of zero and left of zero enabling means such that said right of zero switching means connects said right moving pulses to said add pulse input and said left moving pulses to said subtract pulse input in response to a right moving pulse received by said right of zero switching means through said right of zero enabling means immediately after said zero set condition, and said left of zero switching means connects said right moving pulses to said subtract pulse input and said left moving pulses to said add pulse input in response to a left moving pulse received by left of zero switching means through said left of zero enabling means immediately after said zero set condition, whereby the reading displayed by said counter represents a given distance moved either to the right or left of an initially established reference distance at which said counter means reads zero.

2. A micrometer according to claim 1, in which said means responsive to movement of said first member relative to said second member includes a measuring optical track having alternate transparent and opaque portions secured to said second member; light source means and photocell means secured to said first member to receive said track therebetween; first and second optical tracks disposed between said light source means and said photocell means and secured in set positions relative to each other to said first member, each of said tracks including alternate transparent and opaque portions positioned so that said light source means passes light through said measuring optical track and said first and second optical tracks, said second optical track being offset with respect to said measuring optical track by substantially one-half the width of one of said transparent portions when said first optical track has its transparent portion in registration with said transparent portion in said measuring optical track, said photocell means comprising first and second photocells positioned to receive light passed through said first and second optical tracks, respectively, whereby first and second wave forms displaced in time phase with respect to each other are provided by said photocells upon relative movement of said members; and a sensing logic circuit including said direction sensing means connected to receive said first and second wave forms to provide said right moving pulses and said left moving pulses when said measuring track is caused to move relatively to said first member in one direction and is caused to move relatively to said first member in an opposite direction, respectively.

3. A micrometer, according to claim 1, including a manual zero set control for establishing said zero set enabling condition and setting said counter means to a zero reading.

References Cited in the file of this patent

UNITED STATES PATENTS

| | | |
|---|---|---|
| 2,477,085 | Rieber | July 26, 1949 |
| 2,557,219 | Flint et al. | June 19, 1951 |
| 2,611,964 | Buisson | Sept. 30, 1952 |
| 2,628,539 | De Neergaard | Feb. 17, 1953 |
| 2,656,106 | Stabler | Oct. 20, 1953 |
| 2,670,650 | Wilmotte | Mar. 2, 1954 |
| 2,685,082 | Beman et al. | July 27, 1954 |
| 2,808,650 | Kumagai | Oct. 8, 1957 |
| 2,875,524 | Bower et al. | Mar. 3, 1959 |
| 2,886,717 | Williamson et al. | May 12, 1959 |
| 2,993,279 | Bower | July 25, 1961 |
| 2,998,188 | Mast et al. | Aug. 29, 1961 |

FOREIGN PATENTS

| | | |
|---|---|---|
| 1,150,570 | France | Aug. 12, 1957 |